Feb. 28, 1967  I. OESTERREICHER  3,306,148
STICK FOR A GUILLOTINE-TYPE PAPER-CUTTER MACHINE
Filed Oct. 3, 1963

INVENTOR.
IGNAZ OESTERREICHER
BY
Friedman & Goodman
ATTORNEYS

United States Patent Office 3,306,148
Patented Feb. 28, 1967

3,306,148
STICK FOR A GUILLOTINE-TYPE
PAPER-CUTTER MACHINE
Ignaz Oesterreicher, Schottenfeldgasse 85/8,
Vienna VII, Austria
Filed Oct. 3, 1963, Ser. No. 313,633
Claims priority, application Austria, Sept. 6, 1963,
A 7,205/63
4 Claims. (Cl. 83—658)

The present invention relates to a cutting stick or cutting underlayer and especially for a stick which is adapted for use with a guillotine type paper cutting machine.

In machines of the type to which the present invention relates, the knife cuts various types of material such as, for example, paper, rubber, wood, textiles, celluloid fiber and various types of plastic materials. In performing its cutting operation, the knife cuts into an underlying cutting stick or cutting underlayer to a relatively slight extent but always at the same spot in the stick. This is necessary due to the fact that the lowermost portion or part of the material to be cut is also cut. As a result, a notch is cut by the knife into the underlying cutting stick. Prior art cutting sticks are made of various different materials, for example, fiber wood, pasteboard plastic, rubber, lead, etc. which have a slight degree of resilience or elasticity. As a result, upon the first cut, the knife enters the surface of the stick and forms a notch which is complementary to the edge of the knife. This results in an objectionable result. More specifically, the face of the knife displaces the opposing portion of the underlying stick under the pressure to which the knife is subjected. Although the material has some resiliency or elasticity, the displaced material does not return to its original form or position. Consequently, there is formed on the surface of the stick a relatively wide notch. The notch is in the form of a wide crenation and with respect to the crenation, the overlying material which is cut does not have the necessary underlaying support. As a result, the lowermost portions or layers of the material to be cut are not cut in a clean sharp manner but are provided with a rounded or arcuate cut surface. As the cutting operation continues, the knife forces the lowermost layers of the cut material into the hollow defined by the notch or crenation. The knife pressure is applied in an oblique direction with the result that there is provided a horizontal force which drives the knife toward the center of the notch. As a result, the lowermost layers of the material to be cut will have longer cuts than the overlying layers or portions of the material to be cut.

In addition, due to the fact that the cutting position of the knife is displaced, the succeeding cuts will not be affected at the marginal edge of the notch but will be forced to the center of the notch. As a result, on each of the opposite sides of the notch, there will be developed additional reaction forces which will result in the deformation and the curvature of the notch sides. After a certain number of cuts, the notch will be relatively wide and will be V-shaped with the width of the notch increasing as the wedge angle of the cutting knife is displaced. As a result, there is a displacement of the lowermost layers or portions of the material to be cut. As the point of elasticity of the material being cut is reached, the lowermost layers or portions thereof will become fringed.

Previously, it has been attempted to use for the formation of the cutting stick certain plastics or hard rubber materials which have a predetermined resistance to the cutting operation and a desired degree of elasticity. After the cut into the stick to form the notch therein, the knife was raised and the notch returned to a certain extent toward the former uncut condition of the stick. So long as the edge of the knife is quite sharp, the result is satisfactory. But as the sharpness of the knife decreases, the notch caused in the stick tends to deform much more than on less resistant material with the result that portions of the material to be cut will remain squeezed or impressed into the notch. Consequently, such materials for formation of the stick have been useful only where the knife is well sharpened and where the edge of the knife remains sharp as the operation progresses. However, when it is necessary to change the knife quite frequently or to get the knife sharpened after a relatively short use thereof, there is a resultant loss of time and the costs are increased.

Pursuant to the present invention, there is provided an entirely new type of cutting stick which has a greater resistance to the cutting action of the knife and which also has a superior degree of elasticity or resiliency when compared with prior art sticks. The greater elasticity obviates the previously described disadvantages since the same cutting position may be used for a greater extent. In this connection, the new stick avoids the necessity of changing or resharpeneng the knife after a relatively few strokes, and in addition, provides clean cutting lines in the notch without forming a hollow therein. As a result, the following cuts will be clean and will also extend longitudinally for the same distance. Consequently, the material to be cut will be cut in a perfect continuous manner and will not be punched.

Pursuant to the present invention, the cutting stick is formed of a material which is not homogenous. Up until the present invention, the cutting stick was formed of homogenous material.

Pursuant to the present invention, the cutting stick is composed or comprises plates or relatively thin members of a material which can be cut by a steel knife. The material has a deforming elasticity which even after a deformation up to 30°, returns more or less exactly to its original condition. As a result of the cutting operation, portions of the thin plates or members will be forced in the direction of the cut and will be bent. However, as the knife is retracted, due to the cohesion of the stick with the knife, the bent plates or members will be returned as a result of the elasticity or resiliency thereof to their original position. Consequently, after the completion of the cut and the return of the knife to its upper position, the notch will be substantially closed at the position of the original cut. As a result, the lowermost layers of the material to be cut are in a planar disposition on the cutting table.

Other and further objects and advantages of the present invention will be readily apparent to one skilled in the art from a consideration of the following specification taken in connection with the appended drawings.

In the drawings, which illustrate the best modes presently contemplated for carrying out the invention, FIGURE 1 is a vertical sectional view through a cutting stick which is positioned in a rectangular stick holder which is placed in the channel of a cutting table;

Figure 1:
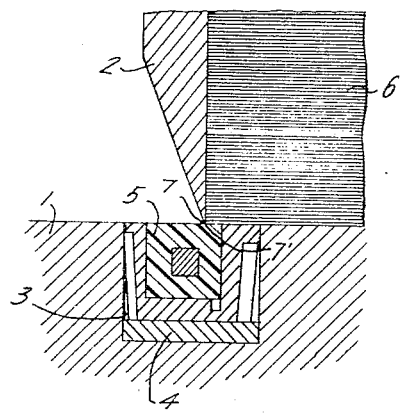
Figure 2:
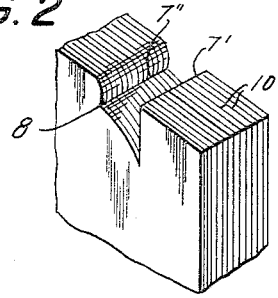
FIGURE 2 illustrates a notch defined in a cutting stick material formed of thin plates or members.

Referring now to the drawings in detail, FIGURE 1 illustrates a conventional stick arrangement. Reference numeral 1 illustrates a conventional rectangular cutting table and reference numeral 2 illustrates the conventional guillotine type cutting knife. The cutting table is provided with a channel 3 in which there is disposed a conventional stickholder 4. A stick 5 is mounted in the stickholder 4. It will be noted that the arrangement is such that the surface of the table, the surface of the stickholder and the surface of the stick are all in the same plane. During the cutting operation, the cutting knife 2 passes through the material 6 which is piled up on the surface of table 1 for the cutting operation. After going completely through the material 6, the knife 2 enters into the stick 5 to form a notch or crenation 7. The marginal edge 7' of the notch 7, which marginal edge underlies and contacts the bottom of the material 6, remains in its original condition or position. However, the portion of the edge of the notch 7 which was contacted by the knife 2 is urged into another position or disposition. It will be readily apparent that the knife 2, as previously described, not only moves vertically downward during the cutting operation, but is also deflected horizontally during said longitudinal movement thereof. As a result, portions of the stick will be displaced in the direction of the longitude of the notch. FIGURE 2 illustrates the condition of the notch with the knife 2 removed therefrom. More specifically, it will be noted that the marginal edge portion 7" is displaced horizontally from the marginal edge 7'. Portions of the material of the stick adjacent the marginal edge 7" are bent into the arcuate top or conformation 8. By using a stick which is formed of homogenous material and which resists the cutting action, the deformation illustrated in FIGURE 2 will remain after the knife is withdrawn if the deforming force supercedes the resilience or elasticity of the material. However, if the stick 5 is formed of thin plates or members 10 of a suitable material, and are easily bent by the knife, the material of which the plates are formed will have the necessary degree of resiliency or elasticity to return to the original condition thereof after the knife is withdrawn. Consequently, when the knife is returned to its upward or retracted position, and during such retraction the face of the knife will rub against the marginal edge 7", the arcuate tops 8 of the notch will return to the original condition of the members 10 thereby closing the notch or crenation 7. The described cutting operation will not deform the marginal edge 7' of the notch and consequently, the notch 7 will provide a longer useful life for the stick 5.

Figure 3:
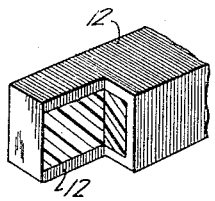
FIGURE 3 illustrates a diagonal section through a thin wall material stick which is made from homogeneous material.

As previously indicated, FIGURE 2 illustrates the utilization of the thin plates or members 10 to define the stick 5, the members 10 extending transversely of the longitudinal axis of the stick 5. By reference to FIGURE 3, it will be noted that the plates or members 10 are formed of a homogenous material which is cut to provide the parallel members 10 which have a thickness preferably in the range from .1 mm. to 3 mm. As a result of the cutting process, the upper part of the stick material will be eventually pressed against the inner part of the stick thereby forming one block. One material of which the members 10 are formed can be plastic-covered sodium paper. The plastic has to provide a good sliding quality. As another example, the members 10 can be formed of the plastic known by the trade name "Teflon" which has a good non-sticking quality.

Figure 4:
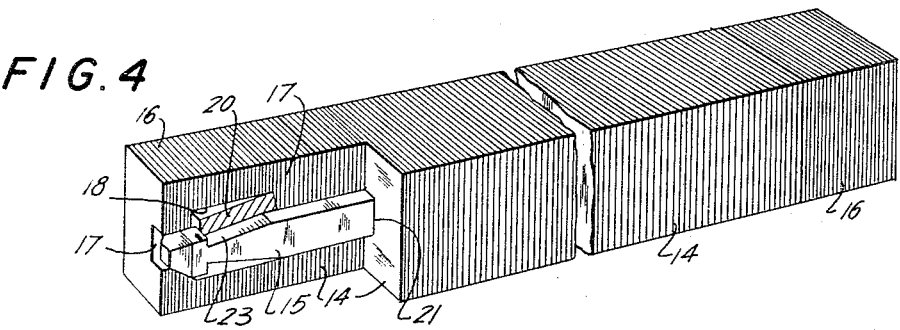
FIGURE 4 illustrates a partial section through a stick comprised of thin walled tin-plates.

FIGURE 4 illustrates, in enlarged scale, a rectangular stick which is formed of the thin members or plates 14 which are less than .1 mm. thick. The individual members 14 are formed with an aperture to insert a connecting device which, as shown in FIGURE 4, is in the form of a steel anchor, the members 14 having a rectangular aperture to receive the anchor.

Figure 5:
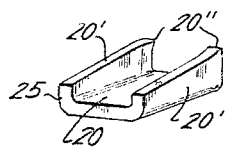
FIGURE 5 is a fragmentary perspective view of a portion of the joint used to automatically link together the parts of the stick.

At each end thereof the stick is provided with an end-piece 16. The end-pieces 16 have the same conformation as the stick and are formed of a readily cuttable material preferably a strip of paper which is covered with plastic. The members 16 are provided with the holes shown at 17 and 18 to insert contacting elements or coupling members 20 as illustrated in FIGURE 5. After the contacting members are inserted, suitable heat and pressure is provided so that the end members 16 form a single block with the stick.

In forming the sticks illustrated in FIGURE 4, the plates or members 14 are first provided and the anchor 15 is inserted in the preformed apertures 21 provided in the members 14. The anchor extends into the end members 16 provided at each end of the stick. The end members are then pressed together with the individual members 14 therebetween under relatively high pressure up to 400 atmospheres. The thickness is decreased up to the degree of hardness required to withstand the cutting pressure. The entire assembly namely the paper strips, plastic overlay or plastic thin strips, the ends, the steel anchor, the connecting parts for the ends, will form one stick and will be complete when taken out of the mold after being subjected to the required pressure.

Figure 6:
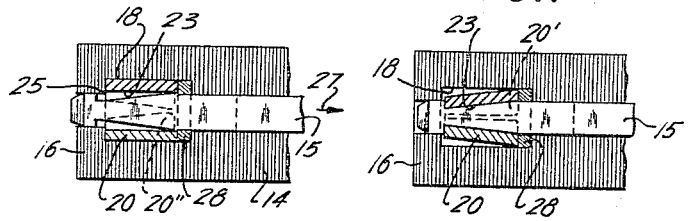
FIGURES 6 and 7 are fragmentary sectional views taken through the end of the stick.
Figure 7:
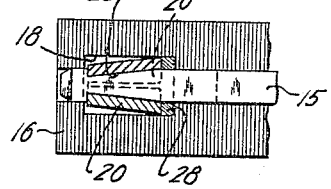

As shown in FIGURES 4, 6 and 7, the anchor is provided at its end with a notch 23 in which there is to be inserted in the anchor 15 the mechanical contacting element 20. The element 20, as shown in FIGURE 5, has side walls 20' which extend upwardly from the base portion 20 and which are provided each with a corner 20". They have smaller dimensions than the inside planes of the side walls 20' and the distance to the corners 20" are dimensioned in such a manner that the corners are fixed or engaged with the opposite side parts of the anchor 15.

In this manner, it will be noted that the top of the anchor at its corners 20" will contact the coupling element 20 and effect a connection therewith. By this connection, the coupling element shown in FIGURE 6 will contact the opposite top plane of the outer side of the opening 18 and will therefore be supported at its end in a horizontal position.

During the fabrication of the strips, the pressure must be decreased so as to get them out of the pressing mold. The tightening of the material will automatically move the anchor 15 in the direction of the arrow 27. As a result of a cohesion at the corners 20' and the side walls of the anchor, the top planes of the coupling element abutting against the supporting ring 28 will move in a diagonal position in the notch 23 as shown in FIGURE 7. By this method, all elements of the stick will be completely linked.

Figure 8:
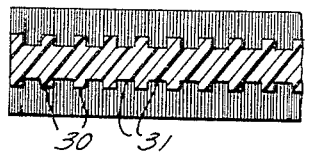
FIGURE 8 illustrates a central section through a stick whose parts are joined together by a centrally sprayed plastic joint.
Figure 9:
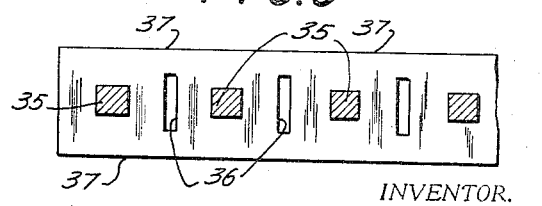
FIGURE 9 illustrates a sectional view through a stick having a steel bar as longitudinal anchorage and having openings to more easily divide the completed stick.
Figure 10:
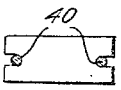
FIGURE 10 is a sectional view taken through a rectangular flat stick.

Referring now to FIGURE 8, there is shown another embodiment of the stick. The plates with holes defined in them will be put into a mold to be pressed together. A suitable plastic or agglutinating material is inserted into the holes 30 and 31 to fill up all the hollow space and from a central unit. After taking the elements out of the pressed form, the elements will be formed into one massive stick. The respective openings in the strips can be arranged in a symmetrical manner or in accordance to the transverse gravitational point as shown in FIGURES 9 and 10. By this method, the pressure of the bending of the material to be cut will be equalized by the pressure of the bending inside of the stick. It is advisable to form holes in the members or plates as shown in FIGURE 9 for placing the anchor 35 therein or to facilitate the sawing through thereof to get the sticks 36. These holes can also be used to decrease the bending pressure of the stick. They may serve by forming both cutting surfaces as at 37.

Another type of stick is shown in FIGURE 10. The holes for inserting the anchor 40 are placed at the outside of the plates. As shown in FIGURE 9, such anchors may be formed inside holes 35 on alternative sides of the outside of the plates thereby reducing the backbending of the stick after the end of the cutting pressure.

It will be understood that various changes and modifications may be made within the present invention without departing from the basic inventive concept thereof as set forth in the appended claims.

I claim:

1. A cutting stick formed of a plurality of relatively thin resilient plates secured together in face to face disposition, and end members to couple said plates together, said plates and end members each having a first aperture and a second aperture, anchor means extending through said first apertures, and plastic material filling said second apertures.

2. A cutting stick comprising a plurality of relatively thin resilient plates secured together in face to face disposition, end members to couple said plates together, said plates being disposed to receive the cut of a cooperating knife transversely of the marginal edges of said plates, said plates being formed of paper coated with plastic material and being less than 0.1 millimeter thick, and an anchor member extending through said plates and into said end members, and a contacting element interconnecting each end member and the associated end of said anchor member.

3. A cutting stick as in claim 2, said anchor member being provided at each end thereof with a notch in which the associated contacting element is inserted.

4. A cutting stick as in claim 2, said plates and said end members each having a first aperture and a second aperture, said anchor member extending through said first apertures and plastic material filling said second apertures.

References Cited by the Examiner

UNITED STATES PATENTS

| | | | |
|---|---|---|---|
| 707,294 | 8/1902 | Blackhall | 83—658 |
| 969,371 | 9/1910 | Helm | 83—658 |
| 1,123,386 | 1/1915 | Russell | 83—658 |
| 2,575,378 | 11/1951 | Bender | 83—658 |
| 2,611,757 | 9/1952 | Olson et al. | 83—658 |
| 2,771,947 | 11/1956 | Cefaly | 83—658 |
| 3,046,824 | 7/1962 | Mohr | 83—648 |
| 3,166,967 | 1/1965 | Garrett | 83—658 |

FOREIGN PATENTS

| | | |
|---|---|---|
| 27,230 | 6/1931 | Australia. |
| 36,540 | 3/1909 | Austria. |
| 170,126 | 1/1952 | Austria. |
| 460,392 | 10/1913 | France. |
| 575,283 | 4/1933 | Germany. |
| 953,430 | 11/1956 | Germany. |
| 741,044 | 11/1955 | Great Britain. |
| 235,583 | 4/1945 | Switzerland. |

ANDREW R. JUHASZ, *Primary Examiner.*

WILLIAM W. DYER, JR., *Examiner.*

J. B. McGUIRE, *Assistant Examiner.*